United States Patent
Chien

(10) Patent No.: US 7,577,293 B2
(45) Date of Patent: Aug. 18, 2009

(54) IMAGE COMPENSATION DEVICE AND METHOD

(75) Inventor: Roger Chien, Shulin (TW)

(73) Assignee: Princeton Technology Corporation, Taipei (TW)

( * ) Notice: Subject to any disclaimer, the term of this patent is extended or adjusted under 35 U.S.C. 154(b) by 769 days.

(21) Appl. No.: 11/347,201

(22) Filed: Feb. 6, 2006

(65) Prior Publication Data
US 2007/0097392 A1    May 3, 2007

(30) Foreign Application Priority Data
Oct. 27, 2005    (TW) .............................. 94137634 A

(51) Int. Cl.
*G06K 9/00* (2006.01)
*H04N 1/60* (2006.01)

(52) U.S. Cl. ..................................... 382/167; 382/118

(58) Field of Classification Search ................ 382/118, 382/162, 164, 165, 167, 173, 176, 224, 254, 382/274, 276; 345/589, 600–604; 358/1.9, 358/515, 518, 523, 525; 348/577, 652
See application file for complete search history.

(56) References Cited

U.S. PATENT DOCUMENTS

| | | | | |
|---|---|---|---|---|
| 5,384,601 A * | 1/1995 | Yamashita et al. | .......... | 348/577 |
| 5,502,508 A * | 3/1996 | Kawabata et al. | ............ | 348/652 |
| 5,828,779 A * | 10/1998 | Maggioni | .................... | 382/165 |
| 6,169,536 B1 * | 1/2001 | Lee et al. | ..................... | 345/589 |
| 6,343,141 B1 * | 1/2002 | Okada et al. | ................. | 382/118 |
| 6,963,663 B1 * | 11/2005 | Yoshida | ...................... | 382/167 |
| 7,020,345 B2 * | 3/2006 | Tsai et al. | .................... | 382/274 |
| 7,348,992 B2 * | 3/2008 | Kim et al. | .................... | 345/589 |
| 7,447,355 B2 * | 11/2008 | Wang et al. | .................. | 382/167 |
| 7,522,769 B2 * | 4/2009 | Harville et al. | ............. | 382/167 |
| 2007/0097392 A1 * | 5/2007 | Chien | ......................... | 358/1.9 |
| 2009/0004126 A1 * | 1/2009 | Lowndes | ..................... | 424/63 |

* cited by examiner

*Primary Examiner*—Amir Alavi
(74) *Attorney, Agent, or Firm*—Muncy, Geissler, Olds & Lowe, PLLC

(57) ABSTRACT

An image compensation method. A color space conversion operation is implemented in a pixel of a source image to convert first image signals corresponding to the pixel to second image signals corresponding to a color space plane. The color space plane comprises a skin color axis comprising a first skin color compensation region and a second skin color compensation region at both sides of the skin color axis. Mathematical operations are implemented in the second image signals to determine where the pixel is located. When the pixel resides in the first skin color compensation region or the second skin color compensation, a compensation operation is implemented in the second image signals. Thus, the color of the pixel approaches the skin color.

22 Claims, 5 Drawing Sheets

IMAGE COMPENSATION DEVICE AND METHOD

BACKGROUND OF THE INVENTION

1. Field of the Invention

The present invention relates to image processing, and in particular to an image compensation method collocating with an auto white balance (AWB) function.

2. Description of the Related Art

Generally, an image extraction device extracts an image using a charge coupled device (CCD) and obtains red, green, and blue (RGB) signals corresponding to the extracted image. Color shift of the RGB signals for an object may be detected due to different color temperatures of the ambient light. An extracted image for a white object, for example, represents a color shift towards red and yellow when a color temperature of the ambient light is low, and, toward to cyan and blue when a color temperature of the ambient light is high.

Currently, an image extraction device (a digital camera, for example) provides auto focus (AF), auto exposure (AE), and AWB to yield an extracted image approaching the real object. AWB modifies the light and shade of an image for color compensation. Colors for an object may be changed due to projected light. The human eye can automatically correct color variation but a camera lens does not provide such function. Thus, AWB enables a camera to achieve color variation, presenting real white based on different conditions by calculating an illumination average and automatically adjusting color balance. Alternatively, AWB calculates illumination according to image attributes and adjusts color degrees of red, green, and blue to correct color bias.

A white balance correction method disclosed converts RGB coordinates of pixels of an extracted image to YCbCr coordinates and calculates averages of Y, Cb, and Cr signals of each sampling blocks. Cb and Cr act as two axes, four quadrants are created according to the two axes, and adjustment is implemented based on the direction shifting to one of the four quadrants. The described AWB correction method can be more accurate if more calculation conditions are obtained, but this requires complicated calculations, which are time-consuming.

Other AWB correction methods comprise a gray-world assumption method and a method for searching light spots. The gray-world assumption method considers the color of the entire extracted image as neutral gray. When a color of the image does not belong to the neutral gray, a R gain value and a B gain value is adjusted to approach the difference there between RG and BG to zero and allow the current gain value to act as the neutral gray. The method, however, cannot perform white balance well such as using the image extraction device to extract an image as the view of the forest or the view of the sunset. The method for searching light spots considers high occurrence probability of the white color around the location of light reflection. The method is implemented by determining whether characteristics of a light spot are precise but frequently results in a wrong determination.

Thus, based on the drawbacks of disclosed white balance methods, an improved image compensation method is desirable.

BRIEF SUMMARY OF THE INVENTION

An image compensation method is provided. In an embodiment of an image compensation method, a color space conversion (CSC) operation is implemented in a pixel of a source image to convert first image signals corresponding to the pixel to second image signals corresponding to a color space plane. The color space plane comprises a skin color axis comprising a first skin color compensation region and a second skin color compensation region at both sides of the skin color axis. Mathematical operations are implemented in the second image signals to determine where the pixel is located. When the pixel resides in the first skin color compensation region or the second skin color compensation region, a compensation operation is implemented in the second image signals. Thus, the color of the pixel approaches the skin color.

An image compensation device is provided. The device of an embodiment comprises a color space conversion unit and an image compensation unit. The color space conversion unit implements a color space conversion operation in a pixel of a source image to convert first image signals corresponding to the pixel to second image signals corresponding to a color space plane. The color space plane comprises a skin color axis comprising a first skin color compensation region and a second skin color compensation region at both sides of the skin color axis. The image compensation unit implements mathematical operations in the second image signals to determine where the pixel is located, and, when the pixel resides in the first skin color compensation region or the second skin color compensation, implements a compensation operation in the second image signals. Thus, the color of the pixel approaches the skin color.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
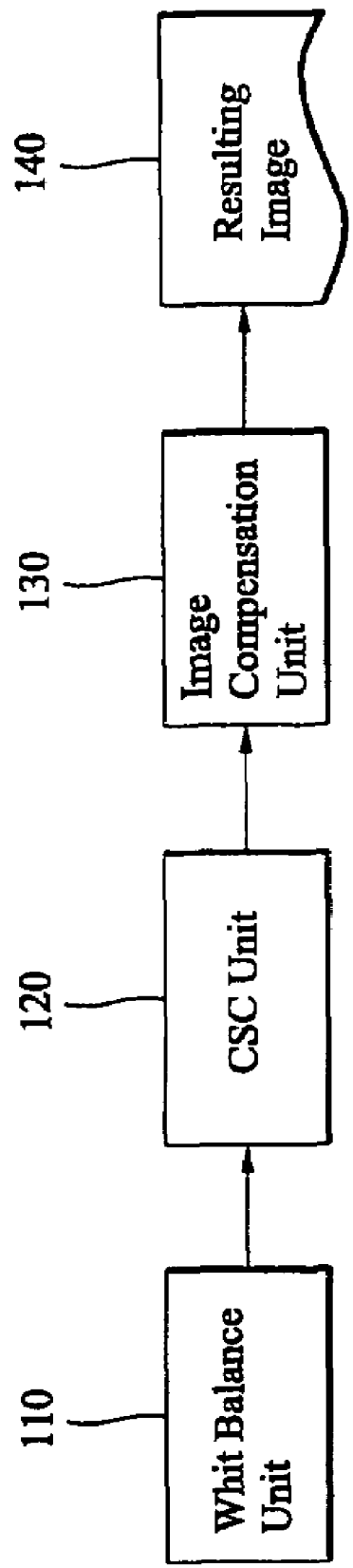
FIG. 1 is a schematic view of an embodiment of the architecture of an image compensation device.

Several exemplary embodiments of the invention are described with reference to FIGS. 1 through 5, which generally relate to image compensation. It is to be understood that the following disclosure provides many different embodiments as examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The invention discloses an image compensation method and device collocating with an auto white balance (AWB) function to approach an extracted image to the real object. The invention compensates colors of an extracted image yield pixel approaching skin color but is not intended to be limitative.

A source image must be converted to appropriate image format before an image compensation method is implemented. A source image is composed of red, green, and blue (RGB) signals. In this embodiment, the RGB signals are converted to a luminance signal (Y) and two chrominance signals (U and V). A conversion formula is represented as:

Y? 0.299R? 0.587G? 0.114B,

U? B? Y, and

V? R? Y.

Geometric operations are implemented in the Y, U, and V values to obtain compensated Y', U', and V' values. The Y', U', and V' values are then converted to R, G, and B values to obtain a resulting image. An image compensation process is illustrated in the following.

FIG. 1 is a schematic view of an embodiment of the architecture of an image compensation device.

An image compensation device comprises a white balance unit 110, a color space conversion unit (CSC) 120, and an image compensation unit 130. White balance unit 100 implements auto white balance in an extracted image. Color space conversion unit 120 converts R, G, and B values of the extracted image to Y, U, and V values using the described conversion formula. Image compensation unit 130 receives the Y, U, and V values and compensates desired pixels using mathematical and logical operations to obtain Y', U', and V' values. The Y', U', and V' values are then converted to R, G, and B values to obtain a resulting image 140.

Figure 2:
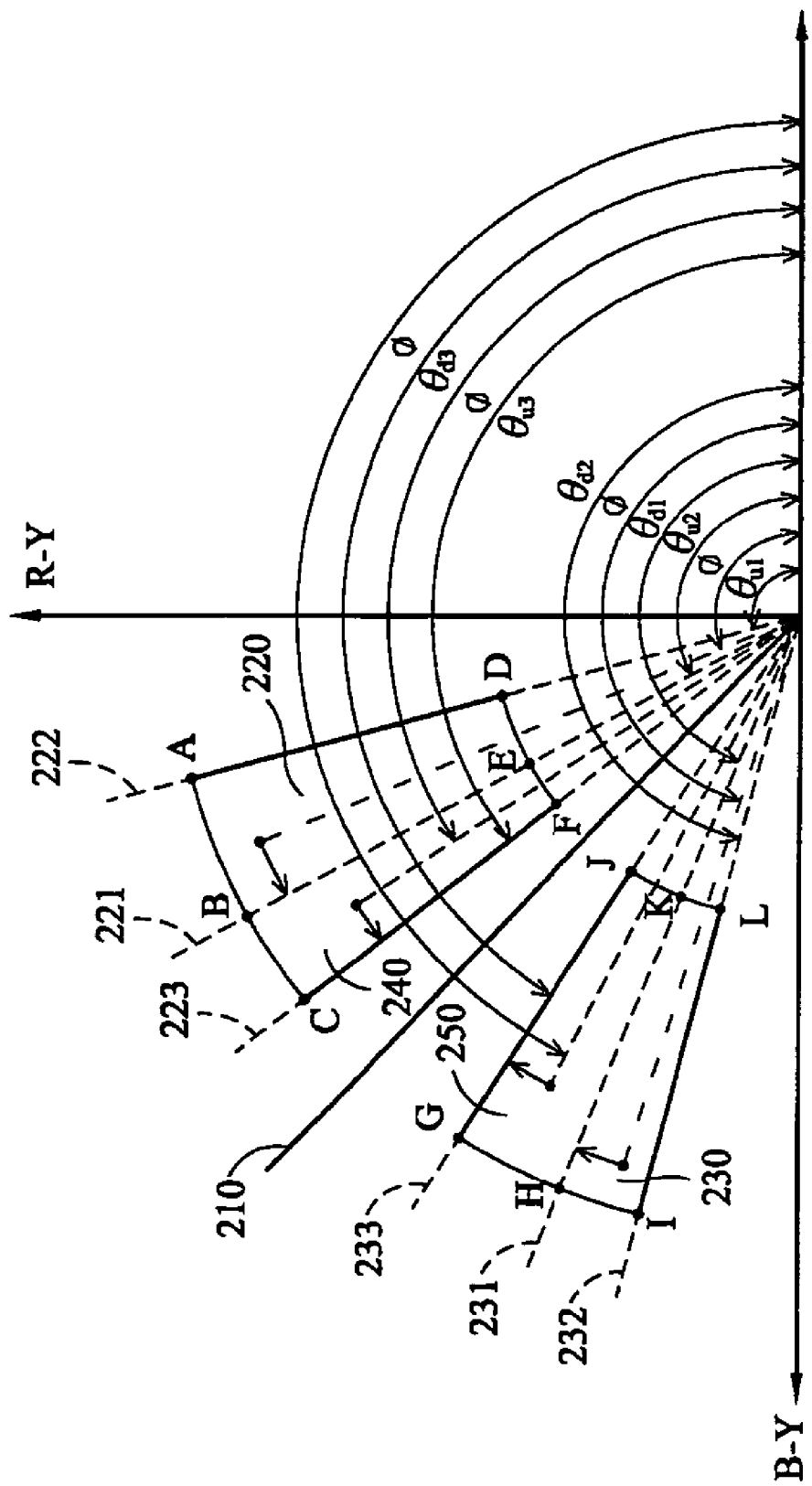
FIG. 2 is a schematic view of a Y-UV plane for an image.

FIG. 2 is a schematic view of a Y-UV plane for an image.

Reference axes and compensation regions on Y-UV plane are defined according to experience or statistical formulas. As shown in FIG. 2, axis 210 is a skin color axis. Pixels residing in axis 210 present a color closest to the skin color while pixels away from axis 210 present a color far from the skin color. The R-Y axis presents a red color axis while the B-Y axis represents a yellow color axis. Pixels closer to the R-Y axis present a color closer to red while pixels closer to the B-Y axis present a color closer to yellow. A first skin color compensation region and a second skin color compensation region are defined at both sides of axis 210. The first skin color compensation region comprises a first sub region 220 and a third sub region 240 and the second skin color compensation region comprises a second sub region 230 and a fourth sub region 250. First sub region 220 is composed of axis 221 and axis 222, which comprises angles $\theta_{u2}$ and $\theta_{u1}$ respectively toward to the B-Y axis, and line segments $\overline{AB}$ and $\overline{DE}$. Second sub region 230 is composed of axis 231 and axis 232, which comprises angles $\theta_{d1}$ and $\theta_{d2}$ respectively toward to the B-Y axis, and line segments $\overline{HI}$ and $\overline{KL}$. Third sub region 240 is composed of axis 221 and axis 223, which comprises angles $\theta_{u2}$ and $\theta_{u3}$ respectively toward to the B-Y axis, and line segments $\overline{BC}$ and $\overline{EF}$. Fourth sub region 250 is composed of axis 231 and axis 233, which comprises angles $\theta_{d1}$ and $\theta_{d3}$ respectively toward to the B-Y axis, and line segments $\overline{GH}$ and $\overline{JK}$. With respect to first sub region 220, when a pixel, providing an axis comprising angle ψ toward to the B-Y axis, resides in a region between axis 221 and axis 222, the pixel must be approximated to be located on axis 221 to approach the skin color. With respect to third sub region 240, when a pixel, providing an axis comprising angle ψ toward to the B-Y axis, resides in a region between axis 221 and axis 223, the pixel is approximated to be located on axis 223 to approach the skin color. With respect to second sub region 230, for example, when a pixel, providing an axis comprising angle ψ toward to the B-Y axis, resides in a region between axis 231 and axis 232, the pixel is approximated to be located on axis 231 to approach the skin color. With respect to fourth sub region 250, for example, when a pixel, providing an axis comprising angle ψ toward to the B-Y axis, resides in a region between axis 231 and axis 233, the pixel is approximated to be located on axis 233 to approach the skin color. Additionally, $r_{max}$ and $r_{min}$ parameters are defined. $R_{max}$ represents a length from point A, B, C, G, H, or I to the origin. $R_{min}$ represents a length from point D, E, F, J, K, or L to the origin. In this embodiment, when a pixel resides in the right region of axis 221 or axis 223 or in the left region of axis 231 or axis 233 ($\theta_{u1}$?ψ?$\theta_{u2}$, $\theta_{u2}$?ψ?$\theta_{u3}$, $\theta_{d1}$?ψ?$\theta_{d2}$, or $\theta_{d3}$?ψ?$\theta_{d1}$), approximation is only implemented in the pixel, such that the angle for each pixel shows ψ in the figure.

Figure 3:
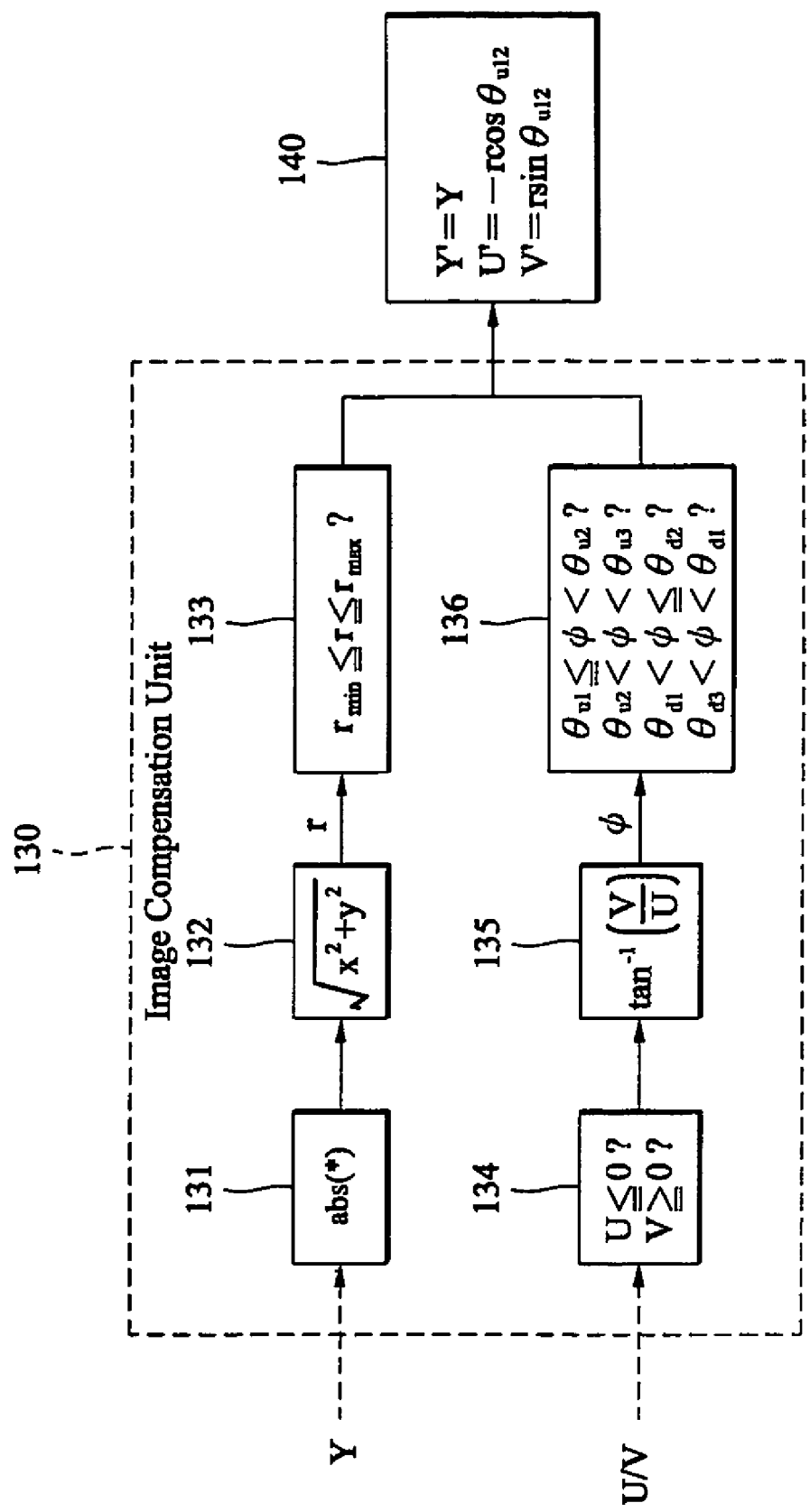
FIG. 3 is a block diagram of an image compensation unit shown in FIG. 1.

FIG. 3 is a block diagram of an image compensation unit shown in FIG. 1.

Function block 131 takes an absolute value of Y value converted from R, G, and B values of a pixel. Function block 132 calculates and obtains an r value according to coordinates of a pixel. Function block 133 determines whether the r value is situated between line segment $\overline{AC}$ and line segment $\overline{DF}$ or line segment $\overline{GI}$ and line segment $\overline{JL}$ such as the first skin color compensation region or the second skin color compensation region. Function block 134 determines whether a pixel resides in the second quadrant of Y-UV plane. Function block 135 calculates and obtains an angle (ψ) of an axis provided by a pixel according to the converted U? V values. Function block 136 determines whether a pixel resides in first sub region 220, second sub region 230, third sub region 240, or fourth sub region 250, indicating whether the pixel is situated between axis 221 and axis 222, axis 221 and axis 223, axis 231 and axis 232, or axis 231 and axis 233.

Figure 4:
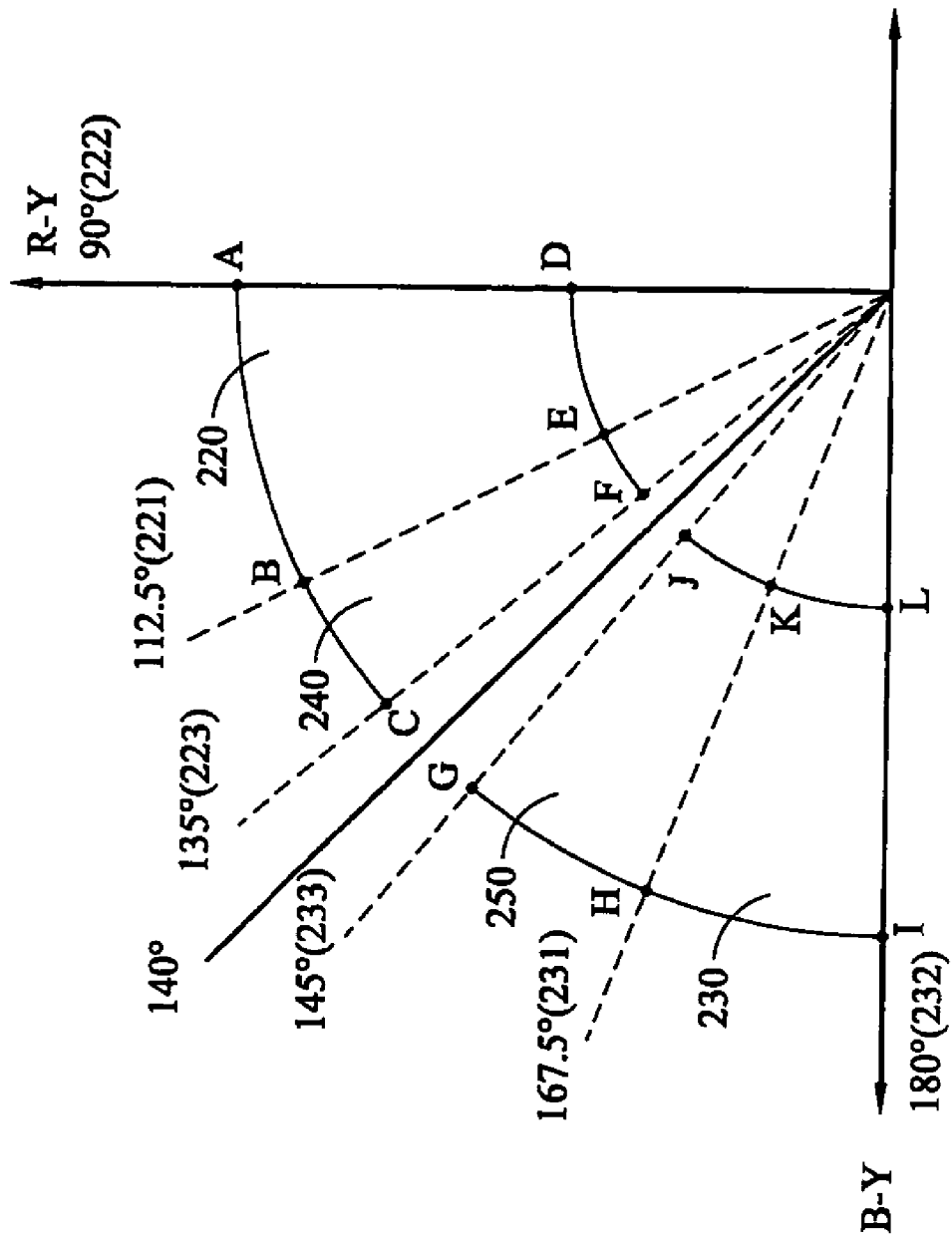
FIG. 4 is an example of an image compensation process.

FIG. 4 is an example of an image compensation process.

Referring to FIG. 4, in this embodiment, axis 140 residing in the second quadrant of Y-UV plane is first defined as a skin color axis, first sub region 220 and third sub region 240 are composed of axis 221, axis 222, and axis 223, which provides 112.5°, 90°, and 135° respectively, and second sub region 220 and fourth sub region 250 are composed of axis 231, axis 232, and axis 233, which provides 167.5°, 180°, and 145° respectively. With respect to first sub region 220 and third sub region 240, when a pixel providing an axis comprising angle ψ toward to the origin resides in a region between axis 221 (112.5°) and axis 222 (90°) or axis 221 (112.5°) and axis 223 (135°), the pixel is approximated to be located on axis 221 (112.5°) or axis 223 (135°) to approach the skin color. Similarly, with respect to second sub region 230 and fourth sub region 250, when a pixel providing an axis comprising angle ψ toward to the origin resides in a region between axis 231 (167.5°) and axis 232 (180°) or axis 231 (167.5°) and axis 233 (145°), the pixel is approximated to be located on axis 231 (167.5°) or axis 233 (145°) to approach the skin color. An image compensation image of another embodiment of the invention can automatically select one or more pixels residing in first sub region 220, second sub region 220, third sub region 240, and fourth sub region 250 for skin color compensation.

Figure 5:
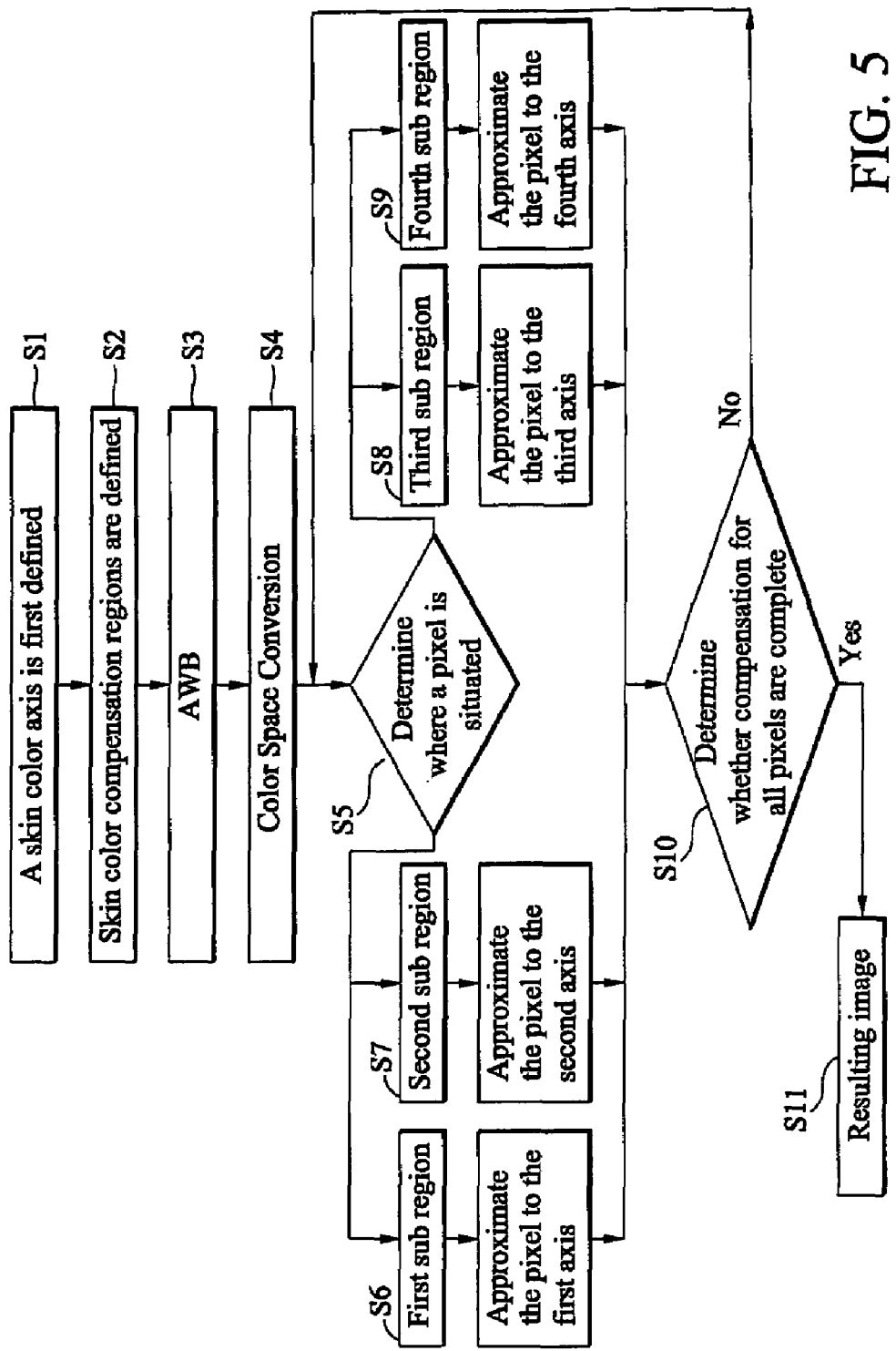
FIG. 5 is a flowchart of an embodiment of an image compensation method.

FIG. 5 is a flowchart of an embodiment of an image compensation method.

A skin color axis is first defined in a color space plane (step S1), which is situated in the second quadrant of the color space plane. A first skin color compensation region (the right region of axis 210 shown in FIG. 2) and a second skin color compensation region (the left region of axis 210 shown in FIG. 2) are defined and situated at both sides of the skin color axis, a first axis (axis 221 shown in FIG. 2), a third axis (axis 223 shown in FIG. 2), and a fifth axis (axis 222 shown in FIG. 2) are defined in the first skin color compensation region, and a second axis (axis 231 shown in FIG. 2), a fourth axis (axis 233 shown in FIG. 2), and a sixth axis (axis 232 shown in FIG. 2) are defined in the second skin color compensation region to divide the first skin color compensation region to at least one first sub region (first sub region 220 in FIG. 2) and third sub region (third sub region 240 in FIG. 2) and the second skin color compensation region to at least one second sub region (second sub region 230) and fourth sub region (fourth sub region 250 in FIG. 2) (step S2). In this embodiment, each skin color compensation region is divided to two sub regions, but is not intended to be limitative. A skin color compensation region can only be divided to three sub regions at most to achieve optimum compensation effects.

AWB is implemented in a source image (step S3) and a color space conversion operation is implemented in the source image to convert R, G, and B values of each pixel thereof to Y, U, and V values corresponding to the color space plane (step S4). Mathematical and logical operations are implemented in the Y, U, and V values to determine where a pixel of the source image resides in the first sub region, the second sub region, the third sub region, or the fourth sub region (step S5). When a pixel resides in the first sub region, a compensation operation is implemented in the pixel to approximate the pixel to be located on the first axis (step S6). When a pixel resides in the second sub region, a compensation operation is implemented in the pixel to approximate the pixel to be located on the second axis (step S7). When a pixel resides in the third sub region, a compensation operation is implemented in the pixel to approximate the pixel to be located on the third axis (step S8). When a pixel resides in the fourth sub region, a compensation operation is implemented in the pixel to approximate the pixel to be located on the fourth axis (step S9). Y, U, and V values of each pixel are compensated to obtain Y', U', and V' values.

Next, it is determined whether compensation for all pixels residing in the first, second, third, or fourth sub region is complete (step S10). If so, the Y', U', and V' values are converted to new R, G, and B values using the color space conversion control (CSC) operation to generate the resulting image (step S11). If not, the process proceeds to step S5 and repeats until the resulting image is generated.

An image compensation method of the invention can compensate extracted images to enable colors of compensated pixels to approach the skin color.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image compensation method, comprising:
    implementing a color space conversion operation in a pixel of a source image to convert first image signals corresponding to the pixel to second image signals corresponding to a color space plane, wherein the color space plane comprises a skin color axis comprising a first skin color compensation region and a second skin color compensation region at both sides of the skin color axis;
    implementing mathematical operations in the second image signals to determine where the pixel is located; and
    when the pixel resides in the first skin color compensation region or the second skin color compensation region, implementing a compensation operation in the second image signals, approximating the pixel to the skin color axis to approach the pixel to the skin color.

2. The image compensation method as claimed in claim 1, further comprising:
    dividing the first skin color compensation region and the second skin color compensation region to a first sub region, a second sub region, a third sub region, and a fourth sub region respectively according to a first axis, a second axis, a third axis, and a fourth axis;
    implementing mathematical operations in the second image signals to determine where the pixel is located; and
    when the pixel resides in the first sub region, the second sub region, the third sub region, or the fourth sub region, implementing a compensation operation in the second image signals to approximate the pixel to be located on the first axis, the second axis, the third axis, or the fourth axis.

3. The image compensation method as claimed in claim 2, wherein comprising:
    creating the first sub region using the first axis and a fifth axis and the second sub region using the second axis and a sixth axis;
    when the pixel resides in the first sub region, implementing a compensation operation in the second image signals to approximate the pixel to be located on the first axis;
    when the pixel resides in the second sub region, implementing a compensation operation in the second image signals to approximate the pixel to be located on the second axis;
    when the pixel resides in the third sub region, implementing a compensation operation in the second image signals to approximate the pixel to be located on the third axis; and
    when the pixel resides in the fourth sub region, implementing a compensation operation in the second image signals to approximate the pixel to be located on the fourth axis.

4. The image compensation method as claimed in claim 3, wherein further comprising:
    determining whether compensations for all pixels residing in the first sub region, the second sub region, the third sub region, or the fourth sub region are complete; and
    when compensations for all pixels are complete, converting second image signals of each pixel by the color space conversion operation to obtain the resulting image, or proceeding with the compensations.

5. The image compensation method as claimed in claim 1, wherein further comprising implementing auto white balance (AWB) in the source image before the color space conversion operation is implemented.

6. The image compensation method as claimed in claim 1, wherein color space conversion further comprises converting RGB image signals of the pixel to YUV image signals corresponding to the color space plane.

7. The image compensation method as claimed in claim 1, wherein the skin color axis resides in the second quadrant of the color space plane.

8. An image compensation device, comprising:
    a color space conversion unit, capable of implementing a color space conversion operation in a pixel of a source image to convert first image signals corresponding to the pixel to second image signals corresponding to a color space plane, wherein the color space plane comprises a skin color axis comprising a first skin color compensation region and a second skin color compensation region at both sides of the skin color axis; and
    an image compensation unit, coupled to the color space conversion unit, capable of implementing mathematical operations in the second image signals to determine where the pixel is located, and, when the pixel resides in the first skin color compensation region or the second skin color compensation, implementing a compensation operation in the second image signals, approximating the pixel to the skin color axis to approach the pixel to the skin color.

9. The image compensation device as claimed in claim 8, wherein the color space conversion unit divides the first skin color compensation region and the second skin color compensation region to a first sub region, a second sub region, a third sub region, and a fourth sub region respectively according to a first axis, a second axis, a third axis, and a fourth axis, and the image compensation unit implements mathematical operations in the second image signals to determine where the pixel is located, and when the pixel resides in the first sub region, the second sub region, the third sub region, or the fourth sub region, implements a compensation operation in the second image signals to approximate the pixel to be located on the first axis, the second axis, the third axis, or the fourth axis 10. The image compensation device as claimed in claim 9, wherein the first sub region is created using the first axis and a fifth axis and the second sub region is created using the second axis and a sixth axis.

11. The image compensation device as claimed in claim 10, wherein the image compensation unit implements a compensation operation in the second image signals to approximate the pixel to be located on the first axis when the pixel resides in the first sub region, implements a compensation operation in the second image signals to approximate the pixel to be located on the second axis when the pixel resides in the second sub region, implements a compensation operation in the second image signals to approximate the pixel to be located on the third axis when the pixel resides in the third sub region, and implements a compensation operation in the second image signals to approximate the pixel to be located on the fourth axis when the pixel resides in the fourth sub region.

12. The image compensation device as claimed in claim 11, wherein the image compensation unit determines whether compensations for all pixels residing in the first sub region, the second sub region, the third sub region, or the fourth sub region are complete, and, if so, converts second image signals of each pixel by the color space conversion operation to obtain the resulting image, or proceeds the compensations.

13. The image compensation device as claimed in claim 8, further comprising an auto white balance unit, coupled to the color space conversion unit, capable of implementing auto white balance in the source image before the color space conversion operation is implemented.

14. The image compensation device as claimed in claim 8, wherein the color space conversion unit converts RGB image signals of the pixel to YUV image signals corresponding to the color space plane.

15. The image compensation device as claimed in claim 8, wherein the skin color axis resides in the second quadrant of the color space plane.

16. A computer-readable storage medium storing a computer program providing an image compensation method, comprising using a computer to perform the steps of:

implementing a color space conversion operation in a pixel of a source image to convert first image signals corresponding to the pixel to second image signals corresponding to a color space plane, wherein the color space plane comprises a skin color axis comprising a first skin color compensation region and a second skin color compensation region at both sides of the skin color axis;

implementing mathematical operations in the second image signals to determine where the pixel is located; and when the pixel resides in the first skin color compensation region or the second skin color compensation region, implementing a compensation operation in the second image signals, approximating the pixel to the skin color axis to approach the pixel to the skin color.

17. The computer-readable storage medium as claimed in claim 16, further comprising:

dividing the first skin color compensation region and the second skin color compensation region to a first sub region, a second sub region, a third sub region, and a fourth sub region respectively according to a first axis, a second axis, a third axis, and a fourth axis;

implementing mathematical operations in the second image signals to determine where the pixel is located; and when the pixel resides in the first sub region, the second sub region, the third sub region, or the fourth sub region, implementing a compensation operation in the second image signals to approximate the pixel to be located on the first axis, the second axis, the third axis, or the fourth axis.

18. The computer-readable storage medium as claimed in claim 17, further comprising:

creating the first sub region using the first axis and a fifth axis and the second sub region using the second axis and a sixth axis;

when the pixel resides in the first sub region, implementing a compensation operation in the second image signals to approximate the pixel to be located on the first axis;

when the pixel resides in the second sub region, implementing a compensation operation in the second image signals to approximate the pixel to be located on the second axis;

when the pixel resides in the third sub region, implementing a compensation operation in the second image signals to approximate the pixel to be located on the third axis; and when the pixel resides in the fourth sub region, implementing a compensation operation in the second image signals to approximate the pixel to be located on the fourth axis.

19. The computer-readable storage medium as claimed in claim 18, further comprising:

determining whether compensations for all pixels residing in the first sub region, the second sub region, the third sub region, or the fourth sub region are complete; and when compensations for all pixels are complete, converting second image signals of each pixel by the color space conversion operation to obtain the resulting image, or proceeding with the compensations.

20. The computer-readable storage medium as claimed in claim 16, wherein further comprising implementing auto white balance (AWB) in the source image before the color space conversion operation is implemented.

21. The computer-readable storage medium as claimed in claim 16, wherein the color space conversion further comprises converting RGB image signals of the pixel to YUV image signals corresponding to the color space plane.

22. The computer-readable storage medium as claimed in claim 16, wherein the skin color axis resides in the second quadrant of the color space plane.

* * * * *

UNITED STATES PATENT AND TRADEMARK OFFICE
CERTIFICATE OF CORRECTION

PATENT NO. : 7,577,293 B2  Page 1 of 1
APPLICATION NO. : 11/347201
DATED : August 18, 2009
INVENTOR(S) : Roger Chien It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Seventh Day of September, 2010

David J. Kappos
*Director of the United States Patent and Trademark Office*